3,028,349
HIGH GLOSS PRINTING INKS
Charles S. Rowland, Tenafly, N.J., and Frederick Varron and Arleen Varron, Briarwood, N.Y., assignors to Interchemical Corporation, New York, N.Y., a corporation of Ohio
No Drawing. Filed Dec. 4, 1959, Ser. No. 857,476
7 Claims. (Cl. 260—24)

This invention relates to moisture setting printing inks. More particularly it relates to moisture setting printing inks containing imine modified acidic resins, which inks upon drying display a high gloss that is superior to that of existing moisture setting printing inks.

Moisture setting printing inks or inks which may be set or dried by the application of water or steam upon the freshly printed film have been widely known and used for a number of years. Such inks and methods of printing therewith are disclosed in Gessler et al. Patent No. 2,157,385, dated May 9, 1939. Such inks contain a water-soluble solvent, usually a glycol, a polyglycol or a mono alkyl ether of a glycol or polyglycol. When water is sprayed upon or otherwise added to a printed film of an ink of this character, it causes the ink binder to be precipitated so that upon evaporation or removal of the solvent and water such as by penetration into the paper, the ink is substantially dry.

While these moisture setting inks have proven valuable in a number of applications, their use has been restricted to limited areas of the printing art because of a major drawback due to their inability to display a high gloss upon drying. Their inability to achieve such a high gloss has in effect prevented the use of moisture setting inks in many areas, particularly in the printing of weekly and monthly national magazines which employ high gloss papers and inks, as well as in the printing of receptacles and cartons for retail food products wherein high gloss is desired to make the products more salable.

It has now been found that improved inks of this type having greatly improved gloss properties may be obtained by using a vehicle comprising a water-soluble solvent from the group consisting of glycols, polyglycols, and water-soluble derivatives thereof, having dissolved therein, as a binder, an imine modified acid resin. The high gloss characteristics of these new inks are attributable to a novel imine modified acidic resin binder produced by the reaction of an acidic resin and an imine. While the preferred embodiment of this invention uses trifunctional imines such as tri-(1,2) propylene phosphoramide its sulfur analog tri-(1,2) propylene thio-phosphoramide and triethylene phosphoramide, it is to be understood that other imines such as propylene imines and ethylene imines and their homologs may also be used in the production of binders providing the ink with the desired gloss characteristics and it is intended to cover such other imines in the claims.

It has been found that best results are obtained by using imines in concentrations which range from 1% to 8% of the entire vehicle weight.

With respect to the acidic resins, it has been found that best results are obtained by using 22% fumarated rosin or an alcohol soluble maleic, modified phenol resin having an acid value of 60–90, a melting point (Mercury method) of 135–145° C., a Gardner color (St'd. 33) at 50% solids of 12–15, and a Gardner-Holdt viscosity (50% solids in solvent) of B–D.

Fumarated rosins may be prepared in accordance with the procedure set forth in U.S. Patent No. 2,244,103 issued June 3, 1941 to Erickson et al. From the disclosure in said patent, it will be obvious to one skilled in the art that homologous acidic resins may also be prepared by modifying natural rosin with maleic acid and other alpha, beta unsaturated organic polybasic acids, and it is, therefore, intended to cover the use of such homologous acidic resins in the claims of this invention.

Other acidic resins such as fumarated rosins having a fumaric acid component concentration between 5% and 25% by weight, gum rosins, limed gum rosins, pentaerythritol modified fumarated rosins, resinous terpene polybasic acids and maleic modified phenol resins also provide very desirable results when used in the binder formation.

The following examples will illustrate the preferred embodiments of this invention.

*Example 1*

49.5 parts by weight of 22% fumarated rosin are dissolved in 49.5 parts of triethylene glycol. The solution is found to have an acid number of 140. 1 part of tri-(1,2) propylene phosphoramide is added and the mixture is heated to and maintained at 170° C. for ½ hour. The product has an acid number of 115. 25 parts of Red Lake C pigment are added. The resulting ink sets well by moisture setting or air drying, the moisture setting being as rapid as that of conventional moisture setting inks. The ink displays an unusually high gloss which is superior to that of conventional moisture setting inks and has press stability at relative humidities as high as 60%.

*Example 2*

Example 1 is repeated using the following proportions by weight:

| | Parts |
|---|---|
| 22% fumarated rosin | 48.5 |
| Triethylene glycol | 48.5 |
| Tri-(1,2) propylene phosphoramide | 3 |
| Red Lake C pigment | 25 |

Prior to the addition of the tri-(1,2) propylene phosphoramide the solution has an acid number of 140. The acid number of the reaction product is 102. The resulting ink has properties equivalent to those of the ink of Example 1 except that the gloss of ink of Example 2 is higher.

*Example 3*

Example 2 is repeated using 7% fumarated rosin instead of 22% fumarated rosin. The resulting ink displays a high gloss.

*Example 4*

Example 1 is repeated using the following proportions by weight:

| | Parts |
|---|---|
| 22% fumarated rosin | 47.5 |
| Triethylene glycol | 47.5 |
| Tri-(1,2) propylene phosphoramide | 5 |
| Red Lake C pigment | 25 |

Prior to the addition of the tri-(1,2) propylene phosphoramide, the solution has an acid number of 140. The acid number of the reaction product is 92. The resulting ink displays a gloss which is even higher than that of the inks of Examples 1 and 2. The other properties of this ink are equivalent to those of the inks of Examples 1 and 2.

The ink of Examples 1–4 are also prepared by using any of the following solvents in place of triethylene glycol: diethylene glycol, dipropylene glycol, hexylene glycol, octylene glycol, propylene glycol, and monomethyl ether of tripropylene glycol.

*Example 5*

Example 4 is repeated using 12% fumarated rosin instead of 22% fumarated rosin. The resulting ink displays a high gloss.

Example 6

49.5 parts by weight of 22% fumarated rosin are dissolved in 49.5 parts of triethylene glycol. The solution is found to have an acid number of 140. 1 part of tri-(1,2) propylene thio-phosphoramide is added and the mixture is heated to and maintained at 170° C. for ½ hour. The product has an acid number of 124. 25 parts of Red Lake C pigment are added. The resulting ink sets well by moisture setting or air drying, the moisture setting rates being the equivalent of those of conventional moisture setting inks. The ink has a press stability at humidities as high as 65% relative humidity. The ink displays an unusually high gloss which is superior to that of conventional moisture setting inks.

The ink may also be prepared by using any of the following solvents in place of triethylene glycol: diethylene glycol, dipropylene glycol, hexylene glycol, octylene glycol, propylene glycol and monomethyl ether of tripropylene glycol.

Example 7

Example 6 is repeated, using the following proportions by weight:

| | Parts |
|---|---|
| 22% fumarated rosin | 48.5 |
| Triethylene glycol | 48.5 |
| Tri-(1,2) propylene thio-phosphoramide | 3 |
| Red Lake C pigment | 25 |

Prior to the addition of the tri-(1,2)propylene thio-phosphoramide, the solution has an acid number of 140. The acid number of the reaction product is 99. The resulting ink displays a gloss higher than that of Examples 1–3, 5 and 6.

Example 8

Example 6 is repeated, using the following proportions by weight:

| | Parts |
|---|---|
| 22% fumarated rosin | 47.5 |
| Triethylene glycol | 47.5 |
| Tri-(1,2) propylene thio-phosphoramide | 5 |
| Red Lake C pigment | 25 |

Prior to the addition of the tri-(1,2) propylene thio-phosphoramide, the solution has an acid number of 140. The acid number of the reaction product is 99. The resulting ink displays a gloss higher than that of Examples 1–3 and 5–7.

Example 9

Example 6 is repeated, using the following proportions by weight:

| | Parts |
|---|---|
| 22% fumarated rosin | 46 |
| Triethylene glycol | 46 |
| Tri-(1,2) propylene thio-phosphoramide | 8 |
| Red Lake C pigment | 25 |

Prior to the addition of the tri-(1,2)propylene thio-phosphoramide, the solution has an acid number of 140. The acid number of the reaction product is 83.

Example 10

32.5 parts by weight of 22% fumarated rosin are dissolved in 32.5 parts of triethylene glycol. The solution is found to have an acid number of 140. 3.5 parts of tri-(1,2) propylene phosphoramide are added and the mixture is maintained at 25° C. (room temperature) for 5 days. The product has an acid value of 116. 7 parts of calcium lithol pigment, 10 parts of molybdate orange, 4.5 parts of iron blue and 10 parts of wax compound are added. The resulting ink sets well by moisture setting or air drying, the moisture setting being as rapid as that of conventional moisture setting inks. The ink displays an unusually high gloss which is superior to that of conventional moisture setting inks.

Example 11

49.5 parts by weight of gum rosin are dissolved in 49.5 parts of triethylene glycol. The solution is found to have an acid number of 82. 1 part of tri-(1,2) propylene phosphoramide is added and the mixture is heated to and maintained at 170° C. for ½ hour. The product has an acid number of approximately 75. 25 parts of Red Lake C pigment are added. The resulting ink displays a high gloss but does not have as good a stability as do the inks of Examples 1 through 10.

Example 12

50.2 g. of gum rosin and 1.5 g. of a hydrated lime are dissolved in 46.3 g. of dipropylene glycol and heated to 160° to 180° C. The solution has an acid number of 109. 2. g. of tri-(1,2) propylene phosphoramide is added and the mixture is maintained at 150–160° C. for ½ hours. To 68.5 g. of the resulting mixture, 7 grams of calcium lithol pigment, 10 g. of molybdate orange, 4.5 g. of iron blue and 10 parts of wax compound are added. The resulting ink sets well by moisture setting or air drying, is press stable and displays an unusually high gloss.

Example 13

| | G |
|---|---|
| A resinous polybasic acid formed by the condensation of terpene and maleic anhydride | 53.5 |
| Diethylene glycol | 43.5 |
| Tri-(1,2) propylene phosphoramide | 3 |
| Calcium lithol pigment | 10.1 |
| Molybdate orange | 14.5 |
| Iron blue | 6.5 |
| Wax compound | 14.5 |

Example 12 is repeated using the above constituents. Prior to the addition of the tri-(1,2) propylene phosphoramide, the solution has an acid number of 75. The acid number of the reaction product is 46. The resulting ink is slower drying by moisture setting or air drying than the inks of the previous examples. However, it does display a high gloss upon drying.

Example 14

Example 13 is repeated, using tri-(1,2) propylene thio-phosphoramide instead of tri-(1,2) propylene phosphoramide. The ink produced has substantially the same characteristics as the ink of Example 13.

Example 15

49.5 parts by weight of a modified fumarated rosin containing 16% by weight of a mixture of 88 parts by weight of pentaerythritol and 12 parts by weight of dipentaerythritol are dissolved in 49.5 parts of triethylene glycol. The solution has an acid number of 62. 1 part of tri-(1,2) propylene phosphoramide is added and the mixture is heated to and maintained at 150–160° C. for ½ hour. The product has an acid number of 48. 25 parts of Red Lake C pigment are added. The resulting ink is less stable than most of the inks of the preceding examples. However, it displays an unusually high gloss and sets very rapidly on moisture setting.

Example 16

46 parts by weight of an alcohol soluble maleic, modified phenol resin having an acid value of 60–90, a melting point (Mercury method) of 135–145° C., a Gardner color (St'd. 33) at 50% solids of 12–15, and a Gardner-Holdt viscosity (50% solids in solvent) of B–D are dissolved in 46 parts of triethylene glycol. The solution has an acid number of 55. 8 parts of tri-(1,2) propylene phosphoramide are added and the mixture is heated to and maintained at 175° C. for ½ hour. The product has an acid number of 15. 25 parts of Red Lake C pigment are added. The resulting ink sets well by moisture setting, exhibits an unusually high gloss which is superior to that of conventional moisture setting inks and has excellent press stability, being stable at 80% Relative Humidity.

*Examples 17, 18 and 19*

Example 16 is repeated using the following proportions:

| | Parts by weight of maleic modified Phenol resin | Parts by weight triethylene glycol | Parts by wt. tri-(1,2) propylene phosphoramide | Parts by wt. Red Lake C pigment | Acid No. prior to adding phosphoramide | Acid No. of product |
|---|---|---|---|---|---|---|
| Example 17 | 47.5 | 47.5 | 5 | 25 | 55 | 24 |
| Example 18 | 48.5 | 48.5 | 3 | 25 | 55 | 34 |
| Example 19 | 49.5 | 49.5 | 1 | 25 | 55 | 48 |

Each of the inks of Examples 17–19, displayed properties equivalent to those of the ink of Example 16.

*Example 20*

Example 17 is repeated using tri-(1,2) propylene thio-phosphoramide instead of tri-(1,2) thio-propylene phosphoramide. The ink produced displayed properties equivalent to those of the inks of Examples 16–19.

*Example 21*

48.5 g. of 22% fumarated rosin are dissolved in 37.5 g. of diethylene glycol. The solution has an acid value of 148. A solution of 3 g. propylene imine in 10 g. of diethylene glycol is added and the mixture is heated to and maintained at 170° C. for ½ hour. The product has an acid number of 95. To 85 g. of the product 7 g. of calcium lithol pigment, 10 g. of molybdate orange, 4.5 g. of iron blue and 10 g. of wax compound are added. The resulting ink sets well by moisture setting or air drying, displays an excellent gloss and press stability.

*Example 22*

48.5 parts by weight of 22% fumarated rosin are dissolved in 48.5 parts of triethylene glycol. The solution is found to have an acid number of 140. 3 parts of ethylene imine are added and the mixture is heated to and maintained at 150° C. for ½ hour. The product has an acid number of 95.2. 25 parts of Red Lake C pigment are added. The resulting ink sets well by moisture setting being more rapid than that of conventional moisture setting inks. The ink displays a high gloss.

*Example 23*

The procedure of Example 22 is repeated using triethylene phosphoramide in place of ethylene imine. The product has an acid number of 95.2. An ink is prepared in accordance with the procedure of Example 22. The ink displays a high gloss and is stable at relative humidities in the area of 50%.

Any of the pigments used in conventional moisture setting inks may be used as pigments. The pigments described in the foregoing examples are merely given for illustration purposes and it is not intended to limit this invention to the use of the pigments described.

Examples can, of course, be multiplied indefinitely without departing from the scope of the invention as defined in the claims. In particular, other water-soluble polyglycols and their water-soluble derivatives may be used and other pigments may be substituted for the pigments used.

What is claimed is:

1. A typographic printing ink characterized by its ability to be set upon the addition of water to a film thereof and by its high gloss upon drying comprising pigment dispersed in a vehicle, the essential binder of which is an imine modified acidic resin comprising the reaction product of a member selected from the group consisting of tripropylene phosphoramide, tripropylene thio-phosphoramide, triethylene phosphoramide, propylene imine, and ethylene imine and an acidic resin selected from the group consisting of fumarated rosins, gum rosins, limed gum rosins, resinous terpene polybasic acids, pentaerythritol modified fumarated rosins and maleic modified phenol resins, said imine modified acid resin being dissolved in a solvent selected from the group consisting of water-soluble glycols and polyglycols and the water-soluble monoethers thereof.

2. A typographic printing ink according to claim 1, wherein said essential binder comprises the reaction product of tri-(1,2) propylene phosphoramide and 22% fumarated rosin dissolved in a solvent selected from the group consisting of water-soluble glycols and polyglycols and the water-soluble monoethers thereof.

3. A typographic printing ink according to claim 1, wherein said essential binder comprises the reaction product of tri-(1,2) propylene phosphoramide and a pentaerythritol modified fumarated rosin comprising 16% by weight of a mixture of 88 parts by weight of pentaerythritol and 12 parts of dipentaerythritol, said reaction product being dissolved in a solvent selected from the group consisting of water-soluble polyglycols and the water-soluble monoethers thereof.

4. A typographic printing ink according to claim 1, wherein the imine is tripropylene phosphoramide and it constitutes from 1% to 8% of the weight of the vehicle.

5. A typographic printing ink according to claim 1, wherein said essential binder comprises the reaction product of tri-(1,2) propylene phosphoramide and an alcohol soluble maleic, modified phenol resin having an acid value of 60–90, a melting point (Mercury method) of 135–145° C., a Gardner color (St'd. 33) at 50% solids of 12–15, and a Gardner-Holdt viscosity (50% solids in solvent) of B–D, said reaction product being dissolved in a solvent selected from the group consisting of water-soluble polyglycols and the water-soluble monoethers thereof.

6. A typographic printing ink according to claim 1, wherein one of the reactants reacted to form the acidic resin is ethylene imine.

7. A typographic printing ink according to claim 1, wherein one of the reactants reacted to form the acidic resin is propylene imine.

References Cited in the file of this patent

UNITED STATES PATENTS

| 2,348,039 | Ulrich et al. | May 2, 1944 |
| 2,436,954 | Denton | Mar. 2, 1948 |
| 2,645,622 | Praeg | July 14, 1953 |